United States Patent [19]

Ohnari et al.

[11] Patent Number: 5,027,278
[45] Date of Patent: * Jun. 25, 1991

[54] METHOD OF ENGINE CONTROL TIMED TO ENGINE REVOLUTION

[75] Inventors: Mikihiko Ohnari, Kokubunji; Teruji Sekozawa, Kawasaki; Motohisa Funabashi, Sagamihara; Takeshi Atago, Katsuta; Makoto Shioya, Suginami, all of Japan

[73] Assignee: Hitachi, Ltd., Tokyo, Japan

[ * ] Notice: The portion of the term of this patent subsequent to Dec. 12, 2006 has been disclaimed.

[21] Appl. No.: 427,373

[22] Filed: Oct. 27, 1989

Related U.S. Application Data

[63] Continuation of Ser. No. 92,613, Sep. 3, 1987, Pat. No. 4,887,216.

[30] Foreign Application Priority Data

Sep. 3, 1986 [JP] Japan ................... 61-205994

[51] Int. Cl.$^5$ .................. F02M 51/00; F02D 41/04
[52] U.S. Cl. ................. 364/431.06; 123/478; 123/480; 364/431.05
[58] Field of Search .............. 364/5, 431.06, 431.07; 123/416, 417, 478, 480, 487, 491

[56] References Cited

U.S. PATENT DOCUMENTS

| | | | |
|---|---|---|---|
| 4,418,674 | 12/1983 | Hasegawa et al. | 123/491 |
| 4,444,173 | 4/1984 | Yamato et al. | 123/491 |
| 4,501,249 | 2/1985 | Amano et al. | 123/478 |
| 4,508,083 | 4/1985 | Hasegawa et al. | 123/491 |
| 4,562,812 | 1/1986 | Chauvel | 123/417 |
| 4,582,035 | 4/1986 | Kishi | 123/478 |
| 4,604,703 | 8/1986 | Hasegawa | 364/431.07 |
| 4,617,899 | 10/1986 | Nakajima | 123/487 |

Primary Examiner—Felix D. Gruber
Attorney, Agent, or Firm—Antonelli, Terry, Stout & Kraus

[57] ABSTRACT

In order to control all revolution numbers of an engine at high precision, combustion of each cylinder is reliably controlled. For the combustion control of each cylinder, there are controlled measurement timings of an air volume as well as a fuel volume contributive to the combustion and exhaust gas being a combustion result, calculation timings of a fuel injection volume and an ignition timing, and output timings of fuel injection and/or ignition. These timings are synchronized by crank angle positions from a reference point such as top dead center. Particularly as to the measurement timing, a delay time of a gas stream between a measurement spot and the cylinder is compensated in terms of a crank angle corresponding thereto, whereby the variables to be measured are synchronized.

76 Claims, 3 Drawing Sheets

METHOD OF ENGINE CONTROL TIMED TO ENGINE REVOLUTION

This is a continuation application of Ser. No. 092,613, filed Sept. 3, 1987, and now U.S. Pat. No. 4,887,216.

BACKGROUND OF THE INVENTION

The present invention relates to a fuel injection equipment and an ignition equipment for engine control, and more particularly to methods of measuring the variables of an engine state and controlling an engine on the basis of the measured results, which is well suited to reliably perform the control of the engine for all revolution numbers by means of a computer for governing the principal functions of the above equipments.

As described in "SYSTEMS AND CONTROL," Vol. 24, No. 5, pp. 306–312, 1980 (Japanese language) the individual operations of a computer program in a prior-art engine control system include two sorts; one started at time intervals and the other started in accordance with engine crank revolution angles.

The prior art has the measurement and control of the variables of an engine state started at the two timings of a time interval and a crank angle (abbreviated to "CA") position, and has had the problem of mismatching attendant upon the different kinds of timings. When the measurement of the revolution number of the engine and the utilization thereof are mentioned as an example, the revolution number is measured by counting crank angle pulses (for example, 360 pulses/revolution) at certain time intervals, and the counted value is input to a computer every 10 ms. This counted value is not synchronous to the crank angle position of the engine. In case of performing a macro-control with average values of data in the equilibrium state in which the engine revolution number hardly changes, even the data asynchronous to the crank angle position is valid. However, in case of finely controlling the revolution number which is the integrated result of nonlinear torques generated by explosion, disadvantageously the data asynchronous to the crank angle position does not correspond to the explosion phenomena.

In U.S. Pat. No. 3,969,614 (Ford Motor Co.), controlled variables are calculated in accordance with electric signals expressive of a selected instant in time while the engine is operative as understood from the statements of column 2, lines 5–9, and column 2, line 26–45 as cited below, but this patent does not defined the timing of the calculation.

Statements of column 2, line 5–9: "A main object of the invention is to employ a digital computer to calculate, on a real-time basis, that is, while the engine is operative, proper settings for one or more of the controlled variables from measurements made on one or more variable engine conditions."

Statements of column 2, line 26–45: "While the engine is operative, an electrical signal is generated in the form of a binary number. This electrical signal is indicative of a condition of the engine as of a selected instant in time. From this binary-number electrical signal indicative of a condition of the engine, a digital computer arithmetically calculates a value corresponding to a setting of the means for controlling the energy conversion process. The digital computer is programmed to calculate the control value from an algebraic function or functions describing a desired relationship between the sensed engine condition and settings of the means for controlling the energy conversion process. The resulting value, in the form of a binary number, is converted into a setting of the means for controlling the energy conversion process. The conversion of the binary number into a setting of the engine controlling means is accomplished with the aid of a suitable electrical circuit coupled between the digital computer and the engine controlling means."

The variables which are sensed for the setting calculations and the controlled variables which are output as calculated results, are defined in the statement of column 1, lines 50–67, "The controlled variables are throttle angle, which controls the amounts of air supplied to the engine, fuel flow per cycle, fuel-injection timing, ignition timing, and, if EGR is used, the settings of the means used to control the amount of exhaust gases recirculated through the engine. To effect control of these variables that determine the characteristics of the energy conversion process, various engine conditions may be sensed while the engine is operative. Thus one or more of the following variable engine conditions may be sensed: crankshaft position, engine speed, mass airflow into the engine, intake-manifold pressure, throttle angle, EGR-valve position, throttle-angle rate of change, engine-speed rate of change, fuel temperature, fuel pressure, EGR-valve rate of change, vehicle speed and acceleration, engine coolant temperature, engine torque, air-to-fuel ratio, exhaust emissions. etc." In the specification of the patent, however, no statement is contained as to the timings during the engine operation at which the variables to be sensed for controlling the energy conversion process are measured.

Heretofore, the discussion of the energy conversion process of an engine has been premised on fuel supply by a carburettor. With the carburettor type, a mixture consisting of fuel and air has been supplied in an amount required by a cylinder. The mixture ratio has been predetermined and maintained despite of the volume and speed of the inlet air flow. Also in a fuel injection system, it has been considered that fuel in a volume corresponding to an inlet air flow may be injected. For such reasons, it can be said that almost no engineer has paid attention to the timing of the measurement of the inlet air flow.

This will be studied from the viewpoint of engine characteristics. A conventional engine has been heavy in weight and has further been furnished with a flywheel, thereby to attain smooth revolutions. That is, it has had the property of absorbing small disturbances and continuing a stable movement owing to a great moment of inertia. A recent engine, however, has been lightened for a high revolution speed and a high response. Due to the high response, the engine responds even to slight disturbances, with the result that it is liable to incur the fluctuation of the engine revolution thereof, the vibration of a car body, etc.

Further, the aforementioned patent aims at establishing the equilibrium state of the engine operation at all times as understood from the statement of column 2, lines 15–19, "A very important feature of the invention is that it now is possible to eliminate the engine operating instabilities characteristic of prior art engine control systems and, by this elimination, to obtain equilibrium conditions of engine operation at all times." The aim is proper for the conventional engine having the great moment of inertia. For establishing the equilibrium state of such an engine, it has not always been necessary to measure the volume of air and the volume of fuel pertinent to combustion in each cylinder and exhaust gas being the product of the combustion, in synchronism with the timing of the combustion thereof.

As regards the recent engine of light weight and high response, however, it is the important theme of engine control to prevent vibrations from occurring or increasing. To this end, individual combustion strokes need to be controlled upon grasping that the movement of the engine is the continuation of transient states. For the prevention of the vibrations, the volume of inlet air must be measured timely and accurately so as to properly set a fuel volume and an ignition timing as desired.

SUMMARY OF THE INVENTION:

An object of the present invention is to provide a control method in which the data items of all variables concerning the combustion control of an engine are gathered or output in synchronism with crank angle positions.

The above object is accomplished by starting tasks (programs of function units) concerning the combustion control of the engine in accordance with the crank angle positions of the engine. The processing times of the respective tasks are always substantially constant because the processing contents thereof are hardly different.

In order to control the engine at high precision by the use of the newest measured data, the timings of the start and end of fuel injection, the calculation of a fuel injection volume, the input of a revolution number, the input of an inlet air flow (or pressure), the outputs of calculated results, etc. as reckoned reversely from the top dead center (TDC) of each cylinder of the engine are previously set to be, for example, synchronous with the crank angle positions of the engine, and the respective processes are executed according to the timings.

The starting point of time of the fuel injection is set at a fixed angle before the TDC. The end point of time of the fuel injection is obtained by the fuel injection volume calculation. The calculation needs to terminate before the end point of time of the fuel injection. In a case where the processing speed of a computer employed is high, the injection volume calculation can be terminated during a fuel injection period. In case of employing a computer of low processing speed, the injection volume calculation is initiated earlier than the starting point of time of the fuel injection.

The engine revolution number and the inlet air flow need to be input to the computer before the initiation of the fuel injection volume calculation because both the variables are used for the calculation. Since both variables are influenced by the revolution movement of the engine, they are input synchronously to the crank angle (CA) positions of the engine. The engine revolution number in the course of the continuation of explosion is measured and input so as to make it possible to measure the transient state of increase or decrease in the revolution number attendant upon the explosion. Concretely, the moving time interval of a CA position difference corresponding to a period including an interval from the start to the end of the explosion is measured, and the CA position difference is divided by the moving time, thereby to count the revolution number within a short interval immediately after the combustion.

The inlet air flow is measured in correspondence with the postiion of the crank angle which is intermediate between the TDC and the bottom dead center (BDC) of the cylinder and at which the inlet air flow becomes the greatest. In a case where a measurement delay is involved in an air flow sensor, the air flow is measured with a timing shifted to the extent of the delay.

The measured data of the revolution number and the inlet air flow are input to the computer basically in synchronism with the CA positions, but they are input with corresponding time delays when measurement delays are existent.

PREFERRED EMBODIMENT OF THE INVENTION:

Now, an embodiment of the present invention will be described in connection with FIGS. 1-4.

Figure 1:
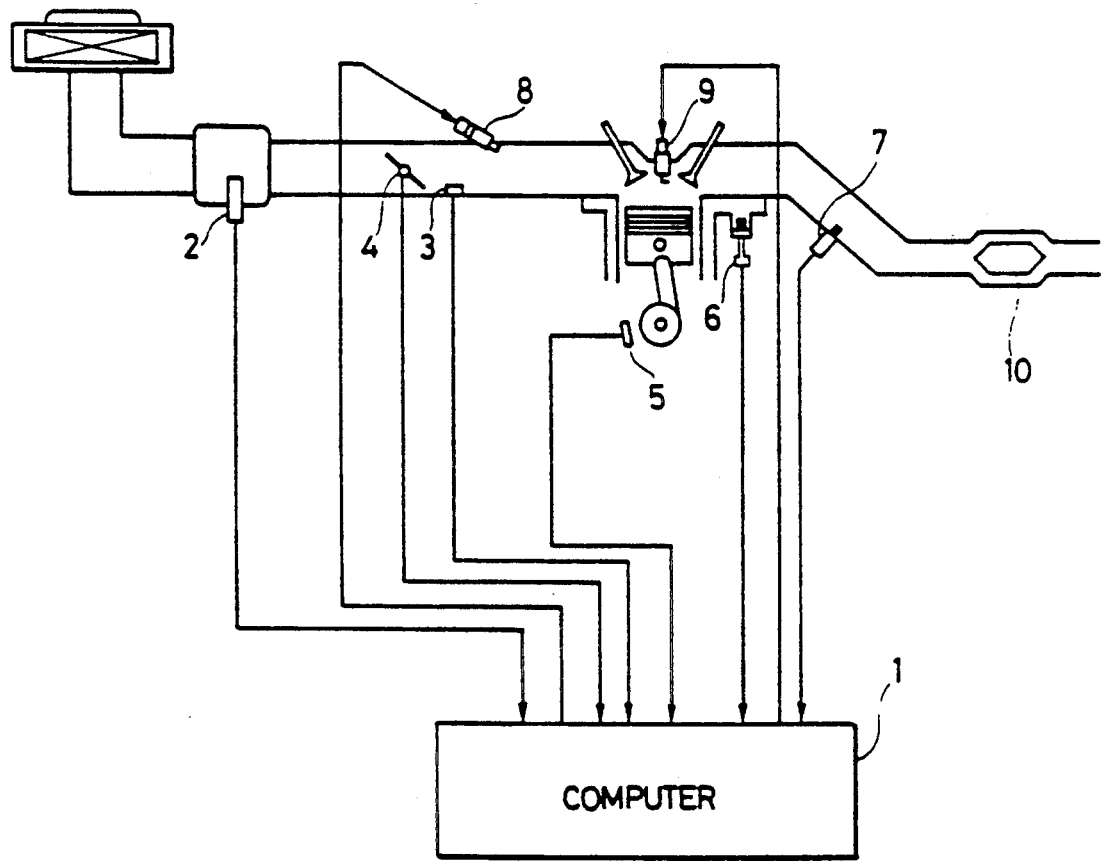
FIG. 1 is a system arrangement diagram of an engine control system to which the present invention is applied.

FIG. 1 shows a system arrangement diagram of an engine control system. An engine controlling computer 1 measures data for engine control by the use of an air flow meter 2 and/or pressure sensor 3, a throttle valve 4, a crank angle position sensor 5, a water temperature sensor 6, and an exhaust gas ($O_2$) sensor 7, whereupon it controls an injector 8 to inject fuel and controls an ignition plug 9 to ignite a mixture. Exhaust gas is cleaned by a catalytic converter 10. The output signal of the crank angle position sensor 5 is composed of a pulse of reference point (for example, top dead center) and pulses corresponding to a crank angle (for example, 360 pulses/revolution).

The sensor 5 is so constructed that 360 holes are provided along the outer periphery of a disc connected to a crank shaft by gears etc., while a hole for the reference point is provided inside the hole corresponding to a position of 0°, and that photosensors each being formed of a pair of light-emitting and light-receiving diodes are mounted with the disc held between the diodes at the outer periphery and the inner side thereof. The computer 1 is supplied with the pulse which is generated each time the hole traverses the photosensor owing to the rotation of the disc.

Figure 3:
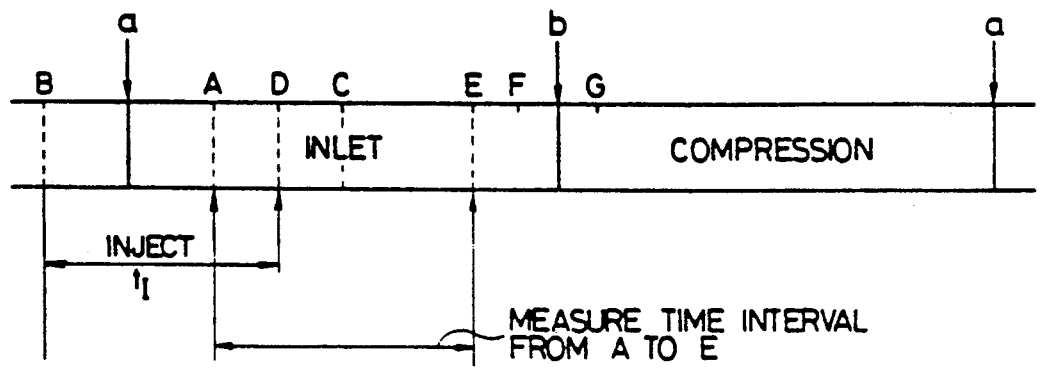
FIG. 3 is a diagram showing the positions of a crank angle in an inlet cycle et seq. with reference to the top dead center of one cylinder.
Figure 2:
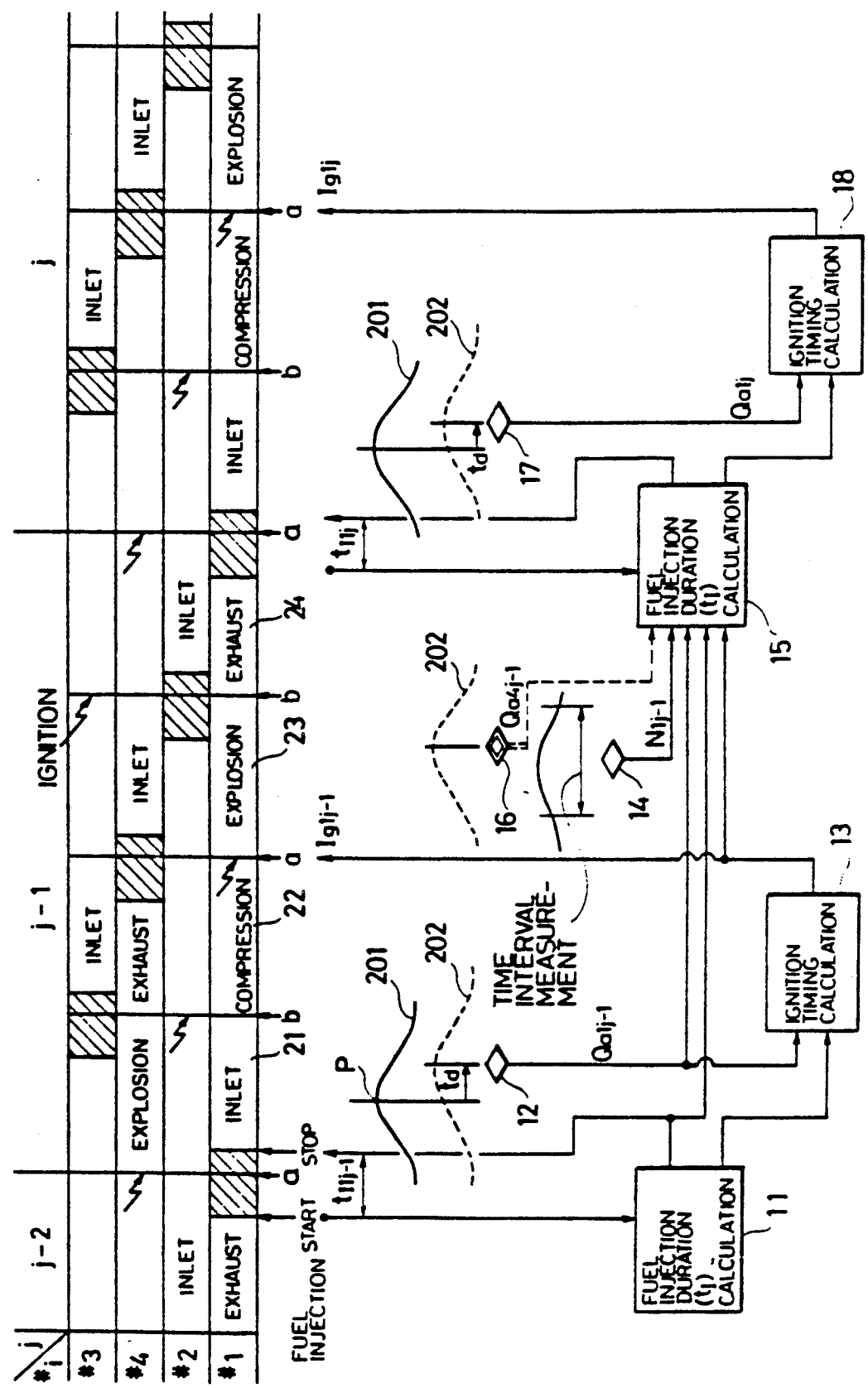
FIG. 2 is a time chart of an embodiment of the present invention.

FIG. 2 shows the cycles of a four-cylinder engine, and the timings of the input of data, the calculation of a fuel injection duration ($t_j$) and the calculation of an ignition timing which are performed in synchronism with the cycles (exactly, crank angle positions measured by the sensor 5 in FIG. 1). FIG. 3 shows the CA positions with reference to the top dead center in the inlet and compression cycles of a certain cylinder.

Cylinder #1 will be referred to in the description. The calculation 11 of the fuel injection duration ($t_j$) is started with the start of fuel injection (the opening of the injector) at a fixed crank angle before a TDC a, and it evaluates a fuel injection duration period $t_{j1j-1}$. When the period has lapsed, the fuel injection is ended. Injected fuel is drawn by suction into the cylinder along with air in the next inlet cycle 21. An air volume ($Q_{a1j-1}$) 12 drawn by this process is measured by the air flow meter 2, the pressure sensor 3 or the like. The inlet air volume is measured at a point of time which is a measurement delay time $t_d$ later than a crank angle position corresponding to a position intermediate between the top dead center a and a bottom dead center b (C°CA in FIG. 3, corresponding to a point at which the descending speed of a piston is the highest).

The inlet air volume can be measured by integrating the air flow drawn by suction into the cylinder. It is difficult, however, to detect the timings of the start and end of the suction. An effective countermeasure against this difficulty is that while the variation of the inlet air volume is being monitored, the peak value thereof is searched for, whereupon the inlet air volume drawn into the cylinder is presumed from the peak value and the revolution number of the engine. When such a measuring method is adopted, the delay time $t_d$ attributed to the velocity lag of the air between the cylinder and a measuring point where the air flow meter 2 is located, can be compensated in terms of a corresponding crank angle. In FIG. 2, a curve 201 indicates the variation of the air volume which is actually drawn into the cylinder, while a curve 202 indicates the variation of the air volume which is measured.

The fuel injected for the duration $t_{flj-1}$ and the inlet air volume measured as the above value $Q_{a1j-1}$ are both drawn into the cylinder, to generate a torque in an explosion cycle 23.

A required torque can be predicted from a throttle opening angle and a running condition. An ignition timing $I_{g1j-1}$ is determined and adjusted by the ignition timing calculation 13 so that the combustion of the air volume and the fuel volume already existing in the cylinder may produce the required torque.

The torque generated according to the values $t_{flj-1}$, $Q_{a1j-1}$ and $I_{g1j-1}$ changes the engine revolution number. The revolution number $N_{1j-1}$ at that time can be determined by the inverse number of a moving time interval measured between two CA positions corresponding to an explosion duration (between A°CA and E°CA in FIG. 3). The revolution number $N_{1j-1}$ thus measured contains also a revolution number increment which has been increased by the current explosion cycle. The revolution number increment can be utilized for identifying the combustion control characteristic of the engine.

In the above, the sequence of the fuel injection volume calculation, the inlet air volume measurement, the ignition timing calculation and the revolution number measurement has been described with the lapse of time. With this sequence, however, it is not ensured that the fuel injection volume be at a ratio corresponding to the inlet air volume, in other words, that a required air/fuel ratio (hereinbelow, abbreviated to "A/F") be established. Therefore, the fuel injection volume needs to be corrected by the ignition timing calculation so as to generate the required torque.

From the aspects of fuel economy and engine vibration prevention, the fuel injection volume should desirably be determined relative to the inlet air volume so as to establish the required A/F. However, the fuel injection volume must be determined before the measurement of the inlet air volume. The prior art has used the measured value of the past inlet air volume without taking into consideration which of the cylinders it was obtained from. In the present invention, with note taken of the correspondence between the generated torque and the fuel and air volumes of each cylinder, the combustion characteristic of each cylinder is identified, whereupon a running condition is grasped. Further, the intention of a driver is presumed. Then, an appropriate fuel injection volume is determined. Regarding a deviation from the predictive presumption, the correction is finally made by the ignition timing calculation.

The calculation of the identification, in a fuel injection duration ($t_f$) calculation 15 in the current process j, uses as inputs the fuel injection duration period $t_{flj-1}$ obtained by the $t_f$ calculation 11 in the last process (j−1), the measured value 12 of the inlet air volume ($Q_{a1j-1}$), the ignition timing $I_{g1j-1}$ obtained by the ignition timing calculation 13 and the measured value 14 of the engine revolution number ($N_{1j-1}$), and identifys the combustion characteristic (the generated torque depending upon the A/F and the ignition angle) of the pertinent cylinder (#1 in the present example). Subsequently, a fuel injection duration period $t_{flj}$ in the current process j is calculated to set the end point of time of fuel injection, on the basis of a combustion characteristic in which the time-serial change of the characteristic of the particular cylinder is also considered, and with notice taken of the newest intention of the driver which is known from the measured value 16 ($Q_{a4j-1}$) of the inlet air volume of another cylinder nearest to the inlet cycle of the particular cylinder. Thereafter, the measured value 17 ($Q_{a1j}$) of the inlet air volume of the particular cylinder is obtained. In a case where it deviates from the presumed air volume, an ignition timing $I_{g1j}$ corresponding to the deviation is calculated and set in an ignition timing calculation 18.

The steps of the above calculations will be described more in detail. When crank angle position signals are input to the computer in correspondence with the positions A–G of the crank angle shown in FIG. 3, computer programs for processes corresponding to the respective crank angle positions are executed by a sequence in FIG. 4.

In FIG. 3, the crank angle positions taken with reference to the top dead center a of the inlet cycle have the following significances:

A°CA: Starting point of measurement for counting revolution number

B°CA: Starting point of fuel injection

C°CA: Middle point between top dead center and bottom dead center

D°CA: End point of fuel injection

E°CA: End point of measurement for counting revolution number

F°CA: Output of ignition signal

G°CA: Starting point of measurement of exhaust gas

The operation of a program will be described with reference to FIG. 4. This program is adapted to start a corresponding one of predetermined subprograms either when the crank angle has come to a certain fixed position or when the value of a timer started within the program has reached a certain value. In addition, the program is so constructed as to monitor the crank angle positions and timers at all times.

When the position A°CA has been reached, the timer A is started in a block 301. The timer A is stopped in a block 310 when the position E°CA has been reached, a time interval elapsed meantime is measured in a block 311, and the revolution number of the engine is counted in a block 312.

When the position B°CA has been reached, the timer B is started in a block 302, while at the same time the fuel injection is started with an output signal in a block 303. The point of time till which fuel is injected, is found by the fuel injection volume ($t_j$) calculation in a block 304.

When it is decided in a block 31 that the timer B has coincided with $t_j$, the fuel injection is ended with an output signal in a block 305.

When the position C°CA has been reached, the timer C is started in a block 306, and the velocity lag $t_c$ of the inlet air volume $Q_a$ is calculated in a block 307 from the engine revolution number N at that time and a constant $K_c$. When it is decided in a block 32 that the value of the timer C has become $t_c$, the inlet air volume $Q_a$ is measured in a block 308. Besides, using this value $Q_a$, the ignition timing F°CA is calculated in a block 309. At the position F°CA, the ignition signal is output in a block 313.

When the position G°CA has been reached beyond the bottom dead center b, the timer D is started in a block 314 in order to measure the exhaust gas, and the velocity lag $t_g$ of the exhaust gas is calculated from the engine revolution number N and a constant $K_g$ in a block 315.

When it is decided in a block 33 that the timer D has coincided with $t_g$, the exhaust gas is measured in a block 316. Using the measured result, the fuel injection volume-correcting calculation (air/fuel ratio control) is performed in a block 317, and an EGR (exhaust gas recirculation) control calculation is performed to provide an output in a block 318.

Figure 4:
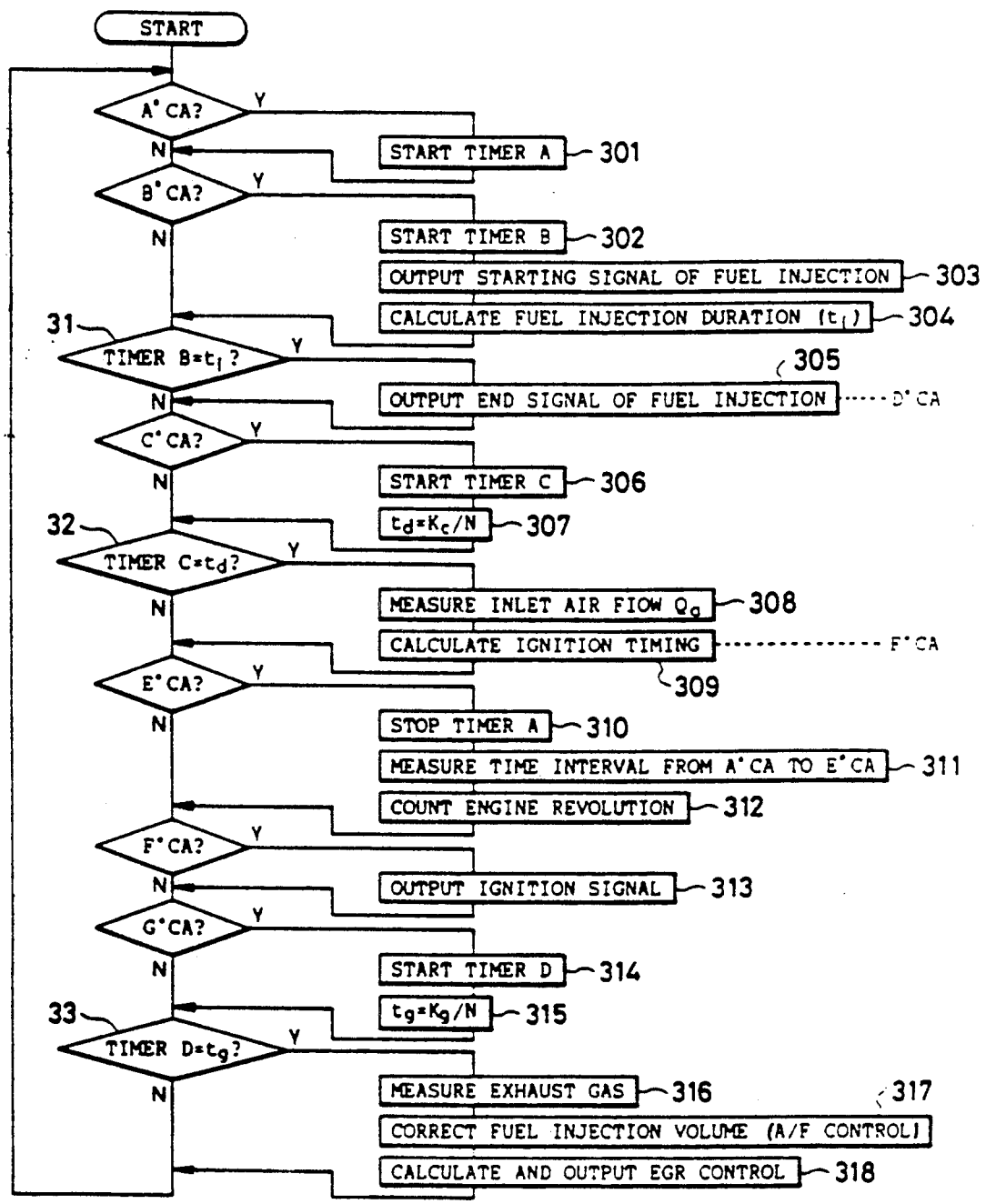
FIG. 4 is a flow chart illustrative of control steps according to the present invention.

Although the illustration of FIGS. 3 and 4 has concerned the single cylinder, the same is carried out for the other cylinders. Besides, the multi-point injection (MPI) wherein the fuel injectors are mounted on the respective cylinders is premised in the above description, but even in case of single-point injection (SPI) wherein a single injector is mounted on a manifold, the present invention can be applied merely by altering the timing and duration period of the fuel injection.

Regarding the measurement of the inlet air volume, the example employing the air flow meter has been described, but the pressure sensor 3 is sometimes used instead of the air flow meter 2. Also in the case of using the pressure sensor for the measurement of the inlet air volume, likewise to the case of using the air flow sensor, the peak value (the smallest value) of a manifold pressure is measured, and the measured value is deemed the typical value of the inlet air volume, whereby the inlet air volume can be calculated.

According to the present invention, phenomena arising with the revolution of an engine are measured in accordance with crank angle positions, and computer programs are started synchronously to the crank angle positions, thereby to perform the controls of fuel injection and an igition timing. Therefore, the physical phenomena can be precisely grasped, and the enhancement of the control performance and the prevention of the vibrations of the engine are attained. Further, it is facilitated to construct a control system and to match control parameters, and in turn, the enhancement of economy can be attained. The reason is that, in the present invention, variables concerning the individual combustion cycle of the engine at any revolution number are measured so as to permit the identification of a combustion characteristic, so whether or not the control system or a matched result is proper can be estimated at each revolution number of the engine.

In the control of the engine, it is sometimes the case that the combustion states of respective cylinders differ to generate ununiform torques. According to the present invention, the differences of the cylinders can also be detected with ease, and the riding quality of an automobile can be improved.

We claim:

1. An engine control system for controlling an engine wherein said engine control is timed to reference engine crank angle positions of an engine revolution and on said engine includes a plurality of cylinders, said system having a controller comprising:
   means for gathering a plurality of variable data items of a combustion of a cylinder of an engine upon occurrence of a reference engine crank angle position measured relative to a predetermined reference point;
   means for outputting control signals calculated on the basis of said gathered data upon occurrence of said reference engine crank angle position;
   means for identifying combustion characteristics of said cylinder on the basis of said data and said control signals; and
   means for correcting said control signals, being calculated with respect to combustion characteristics, according to said identified characteristics in a following calculation of control signals;
   wherein said variable data items are measured values of a flow or pressure of inlet air contributive to combustion in each cylinder of said engine, an engine revolution number immediately after the combustion, and a gas content of exhaust gas emitted by the combustion, while said control signals represent an injected fuel volume and/or an ignition timing.

2. The engine control system as defined in claim 1, wherein the measured value of the inlet air flow is determined by a maximum value chosen among a plurality of data values of said air flow gathered during a predetermined period in the engine cycle and the engine revolution number is determined by a maximum value chosen among a plurality of data values of said engine revolution number gathered during a predetermined period of the engine cycle.

3. The engine control system as defined in claim 1, wherein the measured value of the inlet air flow is determined by a value chosen among a plurality of data values of said air flow gathered during a predetermined period in the engine cycle and the engine revolution number is determined by a value chosen among a plurality of data values of said engine revolution number gathered during a predetermined period of the engine cycle both of said chosen values correspond to each other.

4. An engine control system for controlling an engine wherein said engine control is timed to reference engine crank angle positions of an engine revolution of an internal combustion engine, and said engine includes a plurality of cylinders, said system having a controller comprising:
   means for gathering a plurality of variable data items of a combustion of each cylinder of an engine upon occurrence of a reference engine crank angle position measured relative to a predetermined reference point;
   means for outputting control signals calculated on the basis of said gathered data upon occurrence of said reference engine crank angle position;
   means for identifying combustion characteristics of said each cylinder on the basis of said data and said control signals; and means for correcting said control signals, being calculated with respect to combustion characteristics, according to said identified characteristics in a following calculation of control signals;

wherein a delay time of the flow of a gas stream between a measurement point and said cylinder is compensated in terms of a crank angle for the gathered variable data item.

5. The engine control system as defined in claim 4, wherein said delay time of the flow of the gas stream is identified by gathering said variable data item a plurality of times and searching for a maximum value of variable data items gathered during a predetermined period in the engine cycle.

6. The engine control system as defined in claim 4, wherein said delay time of the flow of the gas stream is identified by gathering said variable data item a plurality of times and searching for a peak value of variable data items gathered during a predetermined period in the engine cycle.

7. An engine control system for controlling an internal combustion engine wherein said engine control is timed to reference engine crank angle positions of an engine revolution of said engine and said engine includes a plurality of cylinders, said system having a controller comprising:

means for gathering a plurality of variable data items relating to a combustion in a cylinder of an engine upon occurrence of respective predetermined reference engine crank angle positions measured relative to a predetermined reference point;

means for calculating control values on the basis of at least some of said variable data items gathered upon occurrence of said reference engine crank angle positions; and means for generating control signals based on said calculated control values;

said engine including means for controlling combustion in said cylinder on the basis of said generated control signals.

8. The engine control system as defined in claim 7, wherein said control is performed according to a computer program and said program includes a plurality of subprograms, and when the crank angle of said engine has reached a preset position, a predetermined one of said subprograms corresponding to said position is run.

9. The engine control system as defined in claim 8, wherein said program includes a subprogram which is run when a built-in timer of said program has reached a preset value.

10. The engine control system according to claim 7, further comprising:

means for identifying combustion characteristics of said cylinder on the basis of said variable data items and said control signals; and means for correcting said control values on the basis of said identified combustion characteristics in a following calculation of control values.

11. An engine control system for controlling an engine wherein said engine control is timed to reference engine crank angle positions of an engine revolution of engine and said engine includes a plurality of cylinders, said system having a controller comprising:

means for measuring an inlet air volume to a cylinder of an engine upon occurrence of a first reference engine crank angle position measured relative to a predetermined reference point;

means for calculating a fuel injection volume corresponding to said air volume;

means for generating a control signal based on said calculated fuel injection volume; and means for applying said control signal to an injector upon occurrence of a second reference engine crank angle position.

12. The engine control system according to claim 11, further comprising:

means for measuring an engine revolution number after a combustion in said cylinder upon occurrence of a third reference engine crank angle position;

means for identifying combustion characteristics of said cylinder on the basis of said measured inlet air volume and measured engine revolution number; and means for correcting said calculated fuel injection volume following said identifying operation performed by said means for identifying using said identified combustion characteristics.

13. An engine control system for controlling an engine wherein said engine control is timed to reference engine crank angles of an engine revolution of said engine and said engine includes a plurality of cylinders, said system having a controller comprising:

means for calculating a value of fuel injection volume to a cylinder corresponding to an inlet air volume to said cylinder predicted from a measured inlet air volume of another cylinder nearest to the inlet cycle of said cylinder;

means for supplying a signal representing said value of fuel injection volume, calculated by said means for calculating, to an injector upon occurrence of a first reference engine crank angle position measured relative to a predetermined reference point;

means for measuring inlet air volume to said cylinder upon occurrence of a second reference engine crank angle position measured relative to said predetermined reference point; and means for calculating an ignition timing corresponding to said measured inlet air volume to said cylinder.

14. The engine control system as defined in claim 13, wherein said means for calculating said ignition timing performs said calculation on the basis of said predicted inlet air volume and said calculated ignition timing is corrected after measuring inlet air volumes.

15. The engine control system as defined in claim 13, wherein said control is realized by a computer program and said program including a plurality of subprograms, and when the crank angle of said engine has reached a preset position, a predetermined one of said subprograms corresponding to said position is run.

16. An engine control system for controlling an engine, wherein said engine control is timed to reference engine crank angle positions of an engine revolution of said engine and said engine includes a plurality of cylinders, said system having a controller comprising:

means for calculating a value of fuel injection volume to a cylinder corresponding to an inlet air volume to said cylinder predicted from a measured inlet air volume of another cylinder nearest to the inlet cycle of said cylinder;

means for supplying a signal representing said value of fuel injection volume, calculated by said means for calculating, to an injector upon occurrence of a first reference engine crank angle position measured relative to a predetermined reference point;

means for measuring inlet air volume to said cylinder upon occurrence of a second reference engine crank angle position measured relative to said predetermined reference point;

means for calculating an ignition timing corresponding to said measured inlet air volume to said cylinder;

means for measuring an engine revolution number after combustion upon occurrence of a third reference engine crank angle position;

means for identifying combustion characteristics of said cylinder on the basis of said calculated and measured inlet air volume and said measured engine revolution number; and means for correcting said fuel injection volume calculated by said means for calculating following said identifying operation performed by said means for identifying according to said identified combustion characteristics.

17. The engine control system as defined in claim 16, wherein said control is realized by a computer program and said program including a plurality of subprograms, and when the crank angle of said engine has reached a preset position, a predetermined one of said subprograms corresponding to said position is run.

18. An engine control system for controlling an engine wherein said control is timed to reference engine crank angle positions of an engine revolution of said engine and said engine includes a plurality of cylinders, said system having a controller comprising:

means for measuring inlet air volume to a cylinder of an engine upon occurrence of a first reference engine crank angle position measured relative to a predetermined reference point;

means for calculating a value of fuel injection volume corresponding to said measured inlet air volume;

means for supplying a signal representing said value of fuel injection volume, calculated by said means for calculating, to an injector upon occurrence of a second reference engine crank angle position;

means for measuring engine revolution number and exhaust gas content after combustion upon occurrence of respective third and fourth reference engine crank angle positions;

means for identifying combustion characteristics of said cylinder on the basis of said inlet air measured volume and revolution number;

means for correcting said fuel injection volume calculated by said means for calculating following said identifying operation performed by said means for identifying with respect to said identified characteristics and according to an A/F ratio related to said measured exhaust gas content.

19. A method of engine control as defined in claim 18, wherein said control is realized by a computer program and said program including a plurality of subprograms, and when the crank angle of said engine has reached a preset position, a predetermined one of said subprograms corresponding to said position is run.

20. An engine control system for controlling an engine, wherein said control is timed to engine revolution of an internal combustion engine, said engine includes a plurality of cylinders, said system having a controller comprising:

means for measuring an inlet air volume to a first cylinder upon occurrence of a first reference engine crank angle position measured relative to a predetermined reference point;

means for predicting an inlet air volume to a second cylinder from said measured inlet air volume to said first cylinder nearest to the inlet cycle of the second cylinder;

means for calculating a value of fuel injection volume to said second cylinder corresponding to said predicted inlet air volume; and means for supplying a signal representing said calculated value of fuel injection volume to an injector of said second cylinder upon occurrence of a second reference engine crank angle position measured relative to said predetermined reference point.

21. An engine control system for controlling an engine wherein said control is timed to engine revolution of an internal combustion engine, said engine includes a plurality of cylinders, said system having a controller comprising:

means for measuring an inlet air volume to a first cylinder upon occurrence of a first engine crank angle position measured relative to a predetermined reference point;

means for predicting an inlet air volume to a second cylinder from said measured inlet air volume to said first cylinder nearest to the inlet cycle of the second cylinder;

means for measuring throttle valve opening;

means for predicting a required torque from said measured throttle valve opening;

means for calculating a value of fuel injection volume to said second cylinder corresponding to said predicted inlet air volume and said predicted torque;

means for calculating an ignition timing corresponding to said calculated fuel injection volume; and means for supplying a signal representing said calculated value of fuel injection volume to an injector of said second cylinder upon occurrence of a second reference engine crank angle position measured relative to a predetermined reference point.

22. The engine control system according to claim 21, further comprising:

means for measuring inlet air volume to said second cylinder upon reference of a third reference engine crank angle position measured relative to said predetermined reference point; and means for correcting said ignition timing after measuring inlet air volume so as to obtain said required torque in such a case that said measured inlet air volume differs from said predicted inlet air volume.

23. A method of engine control timed to reference engine crank angle positions of an engine revolution on said engine including a plurality of cylinders comprising, for each cylinder of the engine, the steps of:

gathering a plurality of variable data items of a combustion of a cylinder of an engine upon occurrence of a reference engine crank angle position measured relative to a predetermined reference point;

outputting control signals calculated on the basis of said gathered data upon occurrence of said reference engine crank angle position;

identifying combustion characteristics of said cylinder on the basis of said data and said control signals; and correcting said control signals, being calculated with respect to combustion characteristics, according to said identified characteristics in a following calculation of control signals;

wherein said variable data items are measured values of a flow or pressure of inlet air contributive to combustion in each cylinder of said engine, an engine revolution number immediately after the combustion, while said control signals represent an injected fuel volume and/or an ignition timing.

24. An engine control system for controlling an engine wherein said engine control is timed to reference engine crank angle positions of an engine revolution on said engine including a plurality of cylinders, said system having a controller comprising:

means for gathering a plurality of variable data items of a combustion of a cylinder of an engine upon occurrence of a reference engine crank angle position measured relative to a predetermined reference point;

means for outputting control signals calculated on the basis of said gathered data upon occurrence of said reference engine crank angle position;

means for identifying combustion characteristics of said cylinder on the basis of said data and said control signals; and means for correcting said control signals, being calculated with respect to combustion characteristics, according to said identified characteristics in a following calculation of control signals;

wherein said variable data items are measured values of a flow or pressure of inlet air contributive to combustion in each cylinder of said engine, an engine revolution number immediately after the combustion, while said control signals represent an injected fuel volume and/or an ignition timing.

25. An engine control system for controlling an engine wherein said engine control is timed to reference engine crank angle positions of an engine revolution of an internal combustion engine and said engine includes a plurality of cylinders, said system having a controller comprising:

means for gathering a plurality of variable data items of a combustion of each cylinder of an engine upon occurrence of a reference engine crank angle position measured relative to a predetermined reference point;

means for outputting control signals calculated on the basis of said gathered data upon occurrence of said reference engine crank angle position;

means for identifying combustion characteristics of said each cylinder on the basis of said data and said control signals; and means for correcting said control signals, being calculated with respect to combustion characteristics, according to said identified characteristics in a following calculation of control signals;

wherein a delay time of the flow of a gas stream between a measurement point and said cylinder is compensated in terms of a crank angle for the gathered variable data item, wherein said gas stream is inlet gas for said cylinder.

26. An engine control system for controlling an engine wherein said engine control is timed to reference engine crank angle positions of an engine revolution of an internal combustion engine and said engine includes a plurality of cylinders, said system having a controller comprising:

means for gathering a plurality of variable data items of a combustion of each cylinder of an engine upon occurrence of a reference engine crank angle position measured relative to a predetermined reference point;

means for outputting control signals calculated on the basis of said gathered data upon occurrence of said reference engine crank angle position;

means for identifying combustion characteristics of said each cylinder on the basis of said data and said control signals; and means for correcting said control signals, being calculated with respect to combustion characteristics, according to said identified characteristics in a following calculation of control signals;

wherein a delay time of the flow of a gas stream between a measurement point and said cylinder is compensated in terms of a crank angle for the gathered variable data item wherein said gas stream is exhaust gas from said cylinder.

27. An engine control system for controlling an engine wherein said engine control is timed to reference engine crank angle positions of an engine revolution of an internal combustion engine and said engine includes a plurality of cylinders, said system having a controller comprising:

means for gathering a plurality of variable data items of a combustion of each cylinder of an engine upon occurrence of a reference engine crank angle position measured relative to a predetermined reference point;

means for outputting control signals calculated on the basis of said gathered data upon occurrence of said reference engine crank angle position;

means for identifying combustion characteristics of said each cylinder on the basis of said data and said control signals; and means for correcting said control signals, being calculated with respect to combustion characteristics, according to said identified characteristics in a following calculation of control signals;

wherein a delay time of the flow of a gas stream between a measurement point and said cylinder is compensated in accordance with a crank angle for the gathered variable data item.

28. A method of engine control timed to reference engine crank angle positions of an engine revolution of an internal combustion engine and said engine includes a plurality of cylinders comprising the steps of:

gathering a plurality of variable data items of a combustion of each cylinder of an engine upon occurrence of a reference engine crank angle position measured relative to a predetermined reference point;

outputting control signals calculated on the basis of said gathered data upon occurrence of said reference engine crank angle position;

identifying combustion characteristics of said each cylinder on the basis of said data and said control signals; and correcting said control signals, being calculated with respect to combustion characteristics, according to said identified characteristics in a following calculation of control signals;

wherein a delay time of the flow of a gas stream between a measurement point and said cylinder is compensated in accordance with a crank angle for the gathered variable data item.

29. A method of engine control timed to engine revolution as defined in claim 28, wherein said delay time of the flow of the gas stream is identified by gathering said variable data item a plurality of times and searching for a peak value of variable data items gathered during a predetermined period in the engine cycle.

30. A method of engine control timed to reference engine crank angle positions of an engine revolution comprising, for each cylinder of the engine, the steps of:

gathering a plurality of variable data items of a combustion of a cylinder of an engine upon occurrence of a reference engine crank angle position measured relative to a predetermined reference point;

outputting control signals calculated on the basis of said gathered data upon occurrence of said reference engine crank angle position;

identifying combustion characteristics of said cylinder on the basis of said data and said control signals; and correcting said control signals, being calculated with respect to combustion characteristics, according to said identified characteristics in a following calculation of control signals;

wherein said variable data items are measured values of a flow or pressure of inlet air contributive to combustion in each cylinder of said engine, an engine revolution number immediately after the combustion, and a gas content of exhaust gas emitted by the combustion, while said control signals represent an injected fuel volume and/or an ignition timing;

wherein the measured value of the inlet air flow is determined by a value chosen among a plurality of data values of said air flow gathered during a predetermined period in the engine cycle and the engine revolution number is determined by a value chosen among a plurality of data values of said engine revolution number gathered during a predetermined period of the engine cycle both of said chosen values correspond to each other.

31. A method of engine control timed to reference engine crank angle positions of an engine revolution of an internal combustion engine, comprising, for each cylinder of the engine, the steps of:

calculating fuel injection volume to a cylinder corresponding to an inlet air volume to said cylinder predicted from a measured inlet air volume of another cylinder nearest to the inlet cycle of said cylinder;

injecting said fuel injection volume calculated in said calculating step, to an injector upon occurrence of a first reference engine crank angle position measured relative to a predetermined reference point;

measuring inlet air volume to said cylinder upon occurrence of a second reference engine crank angle position measured relative to said predetermined reference point;

calculating an ignition timing corresponding to said measured inlet air volume to said cylinder;

measuring an engine revolution number after combustion upon occurrence of a third reference engine crank angle position;

identifying combustion characteristics of said cylinder on the basis of said calculated and measured inlet air volume and said measured engine revolution number; and correcting said fuel injection volume wherein said calculating step follows said identifying step according to said identified combustion characteristics.

32. A method of engine control timed to reference engine crank angle positions of an engine revolution of an internal combustion engine, comprising, for each cylinder of the engine, the steps of:

measuring inlet air volume to a cylinder of an engine upon occurrence of a first reference engine crank angle position measured relative to a predetermined reference point;

calculating fuel injection volume corresponding to said measured inlet air volume;

injecting said fuel injection volume, calculated in said calculating step, using an injector upon occurrence of a second reference engine crank angle position;

measuring engine revolution number and exhaust gas content after combustion upon occurrence of respective third and fourth reference engine crank angle positions;

identifying combustion characteristics of said cylinder on the basis of said inlet air measured volume and revolution number;

correcting said fuel injection volume wherein said calculating step follows said identifying step with respect to said identified combustion characteristics and according to an A/F ratio related to said measured exhaust gas content.

33. A system of engine control for an internal combustion engine, comprising a controller which provides for each cylinder of the engine:

means for detecting a plurality of crank angle positions;

means for gathering a plurality of variable data items of a combustion of a cylinder of an engine upon occurrence of a reference engine crank angle position measured relative to a predetermined reference point;

means for outputting control signals calculated on the basis of said gathered data upon occurrence of said reference engine crank angle position;

means for identifying combustion characteristics of said cylinder on the basis of said data and said control signals; and means for correcting said control signals, being calculated with respect to combustion characteristics, according to said identified characteristics in a following calculation of control signals;

wherein said variable data items are measured values of a flow or pressure of inlet air contributive to combustion in each cylinder of said engine, an engine revolution number immediately after the combustion, and a gas content of exhaust gas emitted by the combustion, while said control signals represent an injected fuel volume and/or an ignition timing.

34. The engine control system as defined in claim 33, wherein the measured value of the inlet air flow is determined by a maximum value chosen among a plurality of data values of said air flow gathered during a predetermined period in the engine cycle and the engine revolution number is determined by a maximum value chosen among a plurality of data values of said engine revolution number gathered during a predetermined period of the engine cycle.

35. The engine control system as defined in claim 33, wherein the measured value of the inlet air flow is determined by a value chosen among a plurality of data values of said air flow gathered during a predetermined period in the engine cycle and the engine revolution number is determined by a value chosen among a plurality of data values of said engine revolution number gathered during a predetermined period of the engine cycle both of said chosen values correspond to each other.

36. A system of engine control for an internal combustion engine, comprising a controller which provides for each cylinder of the engine:
   means for detecting a plurality of crank angle positions;
   means for gathering a plurality of variable data items of a combustion of each cylinder of an engine upon occurrence of a reference engine crank angle position measured relative to a predetermined reference point;
   means for outputting control signals calculated on the basis of said gathered data upon occurrence of said reference engine crank angle position;
   means for identifying combustion characteristics of said each cylinder on the basis of said data and said control signals; and
   means for correcting said control signals, being calculated with respect to combustion characteristics, according to said identified characteristics in a following calculation of control signals;
   wherein a delay time of the flow of a gas stream between a measurement point and said cylinder is compensated in terms of a crank angle for the gathered variable data item.

37. The engine control system as defined in claim 36, wherein said delay time of the flow of the gas stream is identified by gathering said variable data item a plurality of times and searching for a maximum value of variable data items gathered during a predetermined period in the engine cycle.

38. The engine control system according to claim 36, further comprising:
   means for measuring an engine revolution number after a combustion in said cylinder upon occurrence of a third reference engine crank angle position;
   means for identifying combustion characteristics of said cylinder on the basis of said measured inlet air volume and measured engine revolution number; and
   means for correcting said calculated fuel injection volume following said identifying operation performed by said means for identifying using said identified combustion characteristics.

39. A system of engine control for an internal combustion engine, comprising a controller which provides for each cylinder of the engine:
   means for detecting a plurality of crank angle positions;
   means for gathering a plurality of variable data items relating to a combustion in a cylinder of an engine upon occurrence of respective predetermined reference engine crank angle positions measured relative to a predetermined reference point;
   means for calculating control values on the basis of at least some of said variable data items gathered upon occurrence of said reference engine crank angle positions; and
   means for generating control signals based on said calculated control values;
   wherein combustion in said cylinder is controlled on the basis of said generated control signals.

40. The engine control system as defined in claim 39, wherein said control is performed according to a computer program and said program includes a plurality of subprograms, and when the crank angle of said engine has reached a preset position, a predetermined one of said subprograms corresponding to said position is run.

41. The engine control system as defined in claim 40, wherein said program includes a subprogram which is run when a built-in timer of said program has reached a preset value.

42. The engine control system according to claim 39, further comprising:
   means for identifying combustion characteristics of said cylinder on the basis of said variable data items and said control signals; and
   means for correcting said control values on the basis of said identified combustion characteristics in a following calculation of control values.

43. A system of engine control for an internal combustion engine, comprising a controller which provides for each cylinder of the engine:
   means for detecting a plurality of crank angle positions;
   means for measuring an inlet air volume to a cylinder of an engine upon occurrence of a first reference engine crank angle position measured relative to a predetermined reference point;
   means for calculating a fuel injection volume corresponding to said air volume;
   means for generating a control signal based on said calculated fuel injection volume; and
   means for applying said control signal to an injector upon occurrence of a second reference engine crank angle position.

44. The engine control system according to claim 43, further comprising:
   means for measuring an engine revolution number after a combustion in said cylinder upon occurrence of a third reference engine crank angle position;
   means for identifying combustion characteristics of said cylinder on the basis of said measured inlet air volume and measured engine revolution number; and
   means for correcting said calculated fuel injection volume following said identifying operation performed by said means for identifying using said identified combustion characteristics.

45. A system of engine control for an internal combustion engine, comprising a controller which provides for each cylinder of the engine:
   means for detecting a plurality of crank angle positions;
   means for calculating a value of fuel injection volume to a cylinder corresponding to an inlet air volume to said cylinder predicted from a measured inlet air volume of another cylinder nearest to the inlet cycle of said cylinder;
   means for supplying a signal representing said value of said fuel injection volume calculated by said means for calculating to an injector upon occurrence of a first reference engine crank angle position measured relative to a predetermined reference point;
   means for measuring inlet air volume to said cylinder upon occurrence of a second reference engine crank angle position measured relative to said predetermined reference point; and means for calculating an ignition timing corresponding to said measured inlet air volume to said cylinder.

46. The engine control system as defined in claim 45, wherein said calculating operation performed by said means for calculating said ignition timing operation is performed on the basis of said predicted inlet air volume and said calculated ignition timing is corrected after measuring inlet air volumes.

47. The engine control system as defined in claim 45, wherein said control is realized by a computer program and said program includes a plurality of subprograms, and when the crank angle of said engine has reached a preset position, a predetermined one of said subprograms corresponding to said position is run.

48. A system of engine control for an internal combustion engine, comprising a controller which provides for each cylinder of the engine:
   means for detecting a plurality of crank angle position;
   means for calculating a value of fuel injection volume to a cylinder corresponding to an inlet air volume to said cylinder predicted from a measured inlet air volume of another cylinder nearest to the inlet cycle of said cylinder;
   means for supplying a signal representing said value of fuel injection volume, calculated by said means for calculating, to an injector upon occurrence of a first reference engine crank angle position measured relative to a predetermined reference point;
   means for measuring inlet air volume to said cylinder upon occurrence of a second reference engine crank angle position measured relative to said predetermined reference point;
   means for calculating an ignition timing corresponding to said measured inlet air volume to said cylinder;
   means for measuring an engine revolution number after combustion upon occurrence of a third reference engine crank angle position;
   means for identifying combustion characteristics of said cylinder on the basis of said calculated and measured inlet air volume and said measured engine revolution number; and
   means for correcting said fuel injection volume calculated by said means for calculating following said identifying operation performed by said means for identifying according to said identified combustion characteristics.

49. The engine control system as defined in claim 48, wherein said control is realized by a computer program and said program including a plurality of subprograms, and when the crank angle of said engine has reached a preset position, a predetermined one of said subprograms corresponding to said position is run.

50. A system of engine control for an internal combustion engine, comprising a controller which provides for each cylinder of the engine:
   means for detecting a plurality of crank angle positions;
   means for measuring inlet air volume to a cylinder of an engine upon occurrence of a first reference engine crank angle position measured relative to a predetermined reference point;
   means for calculating a value of fuel injection volume corresponding to said measured inlet air volume;
   means for supplying a signal representing said value of fuel injection volume, calculated by said means for calculating, to an injector upon occurrence of a second reference engine crank angle position;
   means for measuring engine revolution number and exhaust gas content after combustion upon occurrence of respective third and fourth reference engine crank angle positions;
   means for identifying combustion characteristics of said cylinder on the basis of said inlet air measured volume and revolution number;
   means for correcting said fuel injection volume calculated by said means for calculating following said identifying operation performed by said means for identifying with respect to said identified characteristics and according to an A/F ratio related to said measured exhaust gas content.

51. A method of engine control as defined in claim 50, wherein said control is realized by a computer program and said program including a plurality of subprograms, and when the crank angle of said engine has reached a preset position, a predetermined one of said subprograms corresponding to said position is run.

52. A system of engine control for an internal combustion engine, comprising a controller which provides for each cylinder of the engine:
   means for detecting a plurality of crank angle positions;
   means for measuring an inlet air volume to a first cylinder upon occurrence of a first reference engine crank angle position measured relative to a predetermined reference point;
   means for predicting an inlet air volume to a second cylinder from said measured inlet air volume to said first cylinder nearest to the inlet cycle of the second cylinder;
   means for calculating a value of fuel injection volume to said second cylinder corresponding to said predicted inlet air volume; and
   means for supplying a signal representing said calculated value of fuel injection volume to an injector of said second cylinder upon occurrence of a second reference engine crank angle position measured relative to said predetermined reference point.

53. A system of engine control for an internal combustion engine, comprising a controller which provides for each cylinder of the engine:
   means for detecting a plurality of crank angle positions;
   means for measuring an inlet air volume to a first cylinder upon occurrence of a first engine crank angle position measured relative to a predetermined reference point;
   means for predicting an inlet air volume to a second cylinder from said measured inlet air volume to said first cylinder nearest to the inlet cycle of the second cylinder;
   means for measuring throttle valve opening;
   means for predicting a required torque from said measured throttle valve opening;
   means for calculating a value of fuel injection volume to said second cylinder corresponding to said predicted inlet air volume and said predicted torque;
   means for calculating an ignition timing corresponding to said calculated fuel injection volume; and
   means for supplying a signal representing said value of calculated fuel injection volume to an injector of said second cylinder upon occurrence of a second reference engine crank angle position measured relative to a predetermined reference point.

54. The engine control system according to claim 53, further comprising:
means for measuring inlet air volume to said second cylinder upon reference of a third reference engine crank angle position measured relative to said predetermined reference point; and
means for correcting said ignition timing after measuring inlet air volume so as to obtain said required torque in such a case that said measured inlet air volume differs from said predicted inlet air volume.

55. A method of engine control for an internal combustion engine, comprising, for each cylinder of the engine, the steps of:
detecting a plurality of crank angle positions;
gathering a plurality of variable data items of a combustion of a cylinder of an engine upon occurrence of a reference engine crank angle position measured relative to a predetermined reference point;
outputting control signals calculated on the basis of said gathered data upon occurrence of said reference engine crank angle position;
identifying combustion characteristics of said cylinder on the basis of said data and said control signals; and
correcting said control signals, being calculated with respect to combustion characteristics, according to said identified characteristics in a following calculation of control signals;
wherein said variable data items are measured values of a flow or pressure of inlet air contributive to combustion in cylinder of said engine, an engine revolution number immediately after the combustion, and a gas content of exhaust gas emitted by the combustion, while said control signals represent an injected fuel volume and/or an ignition timing.

56. A method of engine control as defined in claim 55, wherein the measured value of the inlet air flow is determined by a maximum value chosen among a plurality of data values of said air flow gathered during a predetermined period in the engine cycle and the engine revolution number is determined by a maximum value chosen among a plurality of data values of said engine revolution number gathered during a predetermined period of the engine cycle.

57. The engine control system as defined in claim 55, wherein the measured value of the inlet air flow is determined by a value chosen among a plurality of data values of said air flow gathered during a predetermined period in the engine cycle and the engine revolution number is determined by a value chosen among a plurality of data values of said engine revolution number gathered during a predetermined period of the engine cycle both of said chosen values correspond to each other.

58. A method of engine control for an internal combustion engine, comprising, for each cylinder of the engine, the steps of:
detecting a plurality of crank angle positions;
gathering a plurality of variable data items of a combustion of each cylinder of an engine upon occurrence of a reference engine crank angle position measured relative to a predetermined reference point;
outputting control signals calculated on the basis of said gathered data upon occurrence of said reference engine crank angle position;
identifying combustion characteristics of said each cylinder on the basis of said data and said control signals; and
correcting said control signals, being calculated with respect to combustion characteristics, according to said identified characteristics in a following calculation of control signals;
wherein a delay time of the flow of a gas stream between a measurement point and said cylinder is compensated in terms of a crank angle for the gathered variable data item.

59. A method of engine control as defined in claim 58, wherein said delay time of the flow of the gas stream is identified by gathering said variable data item a plurality of times and searching for a maximum value of variable data items gathered during a predetermined period in the engine cycle.

60. The engine control system as defined in claim 58, wherein said delay time of the flow of the gas stream is identified by gathering said variable data item a plurality of times and searching for a peak value of variable data items gathered during a predetermined period in the engine cycle.

61. A method of engine control for an internal combustion engine, comprising, for each cylinder of the engine, the steps of:
detecting a plurality of crank angle positions;
gathering a plurality of variable data items relating to a combustion in a cylinder of an engine upon occurrence of respective predetermined reference engine crank angle positions measured relative to a predetermined reference point;
calculating control values on the basis of at least some of said variable data items gathered upon occurrence of said reference engine crank angle positions;
generating control signals based on said calculated control values; and
controlling combustion in said cylinder on the basis of said generated control signals.

62. A method of engine control as defined in claim 61, wherein said program includes a plurality of subprograms, and when the crank angle of said engine has reached a preset position, a predetermined one of sid subprograms corresponding to said position is run.

63. A method of engine control as defined in claim 62, wherein said program includes a subprogram which is run when a built-in timer of said program has reached a preset value.

64. A method of engine control according to claim 61, further including the steps of:
identifying combustion characteristics of said cylinder on the basis of said variable data items and said control signals; and
correcting said control values on the basis of said identified combustion characteristics in a following calculation of control values.

65. A method of engine control for an internal combustion engine, comprising, for each cylinder of the engine, the steps of:
detecting a plurality of crank angle positions;
measuring an inlet air volume to a cylinder of an engine upon occurrence of a first reference engine crank angle position measured relative to a predetermined reference point;

calculating a fuel injection volume corresponding to said air volume;
generating a control signal based on said calculated fuel injection volume; and
injecting said fuel injection volume calculated in said calculating step by applying said control signal to an injector upon occurrence of a second reference engine crank angle position.

66. A method of engine control according to claim 65, further including the steps of:
measuring an engine revolution number after a combustion in said cylinder upon occurrence of a third reference engine crank angle position;
identifying combustion characteristics of said cylinder on the basis of said measured inlet air volume and measured engine revolution number; and
correcting said calculated fuel injection volume following said identifying step using said identified combustion characteristics.

67. A method of engine control for an internal combustion engine, comprising, for each cylinder of the engine, the steps of:
detecting a plurality of crank angle positions;
calculating fuel injection volume to a cylinder corresponding to an inlet air volume to said cylinder predicted from a measured inlet air volume of another cylinder nearest to the inlet cycle of said cylinder;
injecting said fuel injection volume calculated in said calculating step to an injector upon occurrence of a first reference engine crank angle position measured relative to a predetermined reference point;
measuring inlet air volume to said cylinder upon occurrence of a second reference engine crank angle position measured relative to said predetermined reference point; and
calculating an ignition timing corresponding to said measured inlet air volume to said cylinder.

68. A method of engine control as defined in claim 67, wherein said step of calculating said ignition timing operation is executed on the basis of said predicted inlet air volume and said calculated ignition timing is corrected after measuring inlet air volumes.

69. A method of engine control as defined in claim 67, wherein each step is realized by a computer program and said program includes a plurality of subprograms, and when the crank angle of said engine has reached a preset position, a predetermined one of said subprograms corresponding to said position is run.

70. A method of engine control for an internal combustion engine, comprising, for each cylinder of the engine, the steps of:
detecting a plurality of crank angle positions;
calculating fuel injection volume to a cylinder corresponding to an inlet air volume to said cylinder predicted from a measured inlet air volume of another cylinder nearest to the inlet cycle of said cylinder;
injecting said fuel injection volume calculated in said calculating step, to an injector upon occurrence of a first reference engine crank angle position measured relative to a predetermined reference point;
measuring inlet air volume to said cylinder upon occurrence of a second reference engine crank angle position measured relative to said predetermined reference point;
calculating an ignition timing corresponding to said measured inlet air volume to said cylinder;
measuring an engine revolution number after combustion upon occurrence of a third reference engine crank angle position;
identifying combustion characteristics of said cylinder on the basis of said calculated and measured inlet air volume and said measured engine revolution number; and
correcting said fuel injection volume calculated in said calculating step following said identifying step according to said identified combustion characteristics.

71. A method of engine control as defined in claim 70, wherein each step is realized by a computer program and said program includes a plurality of subprograms, and when the crank angle of said engine has reached a preset position, a predetermined one of said subprograms corresponding to said position is run.

72. A method of engine control for an internal combustion engine, comprising, for each cylinder of the engine, the steps of:
detecting a plurality of crank angle positions;
measuring inlet air volume to a cylinder of an engine upon occurrence of a first reference engine crank angle position measured relative to a predetermined reference point;
calculating fuel injection volume corresponding to said measured inlet air volume;
injecting said fuel injection volume, calculated in said calculating step, using an injector upon occurrence of a second reference engine crank angle position;
measuring engine revolution number and exhaust gas content after combustion upon occurrence of respective third and fourth reference engine crank angle positions;
identifying combustion characteristics of said cylinder on the basis of said inlet air measured volume and revolution number;
correcting said fuel injection volume calculated in said calculating step following said identifying step with respect to said identified characteristics and according to an A/F ratio related to said measured exhaust gas content.

73. A method of engine control as defined in claim 72, wherein each step is realized by a computer program and said program includes a plurality of subprograms, and when the crank angle of said engine has reached a preset position, a predetermined one of said subprograms corresponding to said position is run.

74. A method of engine control for an internal combustion engine, comprising, for each cylinder of the engine, the steps of:
detecting a plurality of crank angle positions;
measuring an inlet air volume to a first cylinder upon occurrence of a first reference engine crank angle position measured relative to a predetermined reference point;
predicting an inlet air volume to a second cylinder from said measured inlet air volume to said first cylinder nearest to the inlet cycle of the second cylinder;
calculating fuel injection volume to said second cylinder corresponding to said predicted inlet air volume; and
injecting said calculated fuel injection volume to an injector of said second cylinder upon occurrence of a second reference engine crank angle position measured relative to said predetermined reference point.

75. A method of engine control for an internal combustion engine, comprising, for each cylinder of the engine, the steps of:
    detecting a plurality of crank angle positions;
    measuring an inlet air volume to a first cylinder upon occurrence of a first engine crank angle position measured relative to a predetermined reference point;
    predicting an inlet air volume to a second cylinder from said measured inlet air volume to said first cylinder nearest to the inlet cycle of the second cylinder;
    measuring throttle valve opening;
    predicting a required torque from said measured throttle valve opening;
    calculating fuel injection volume to said second cylinder corresponding to said predicted inlet air volume and said predicted torque;
    calculating an ignition timing corresponding to said calculated fuel injection volume; and
    injecting said calculated fuel injection volume to an injector of said second cylinder upon occurrence of a second reference engine crank angle position measured relative to a predetermined reference point.

76. A method of engine control according to claim 75, further including the steps of:
    measuring inlet air volume to said second cylinder upon reference of a third reference engine crank angle position measured relative to said predetermined reference point; and
    correcting said ignition timing after measuring inlet air volume so as to obtain said required torque in such a case that said measured inlet air volume differs from said predicted inlet air volume.

* * * * *